(12) United States Patent
Stone et al.

(10) Patent No.: US 10,467,055 B2
(45) Date of Patent: *Nov. 5, 2019

(54) COMPUTER RESOURCE PROVISIONING FAILURE MITIGATION

(71) Applicant: Amazon Technologies, Inc., Seattle, WA (US)

(72) Inventors: Eric Samuel Stone, Seattle, WA (US); Thomas Hans Deml, Berlin (DE); Mihir Rajendrabhai Patel, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 54 days.

This patent is subject to a terminal disclaimer.

(21) Appl. No.: 15/295,863

(22) Filed: Oct. 17, 2016

(65) Prior Publication Data
US 2017/0031714 A1   Feb. 2, 2017

Related U.S. Application Data

(63) Continuation of application No. 14/020,186, filed on Sep. 6, 2013, now Pat. No. 9,471,349.

(51) Int. Cl.
*G06F 9/50* (2006.01)
*G06F 9/455* (2018.01)

(52) U.S. Cl.
CPC ........ *G06F 9/5005* (2013.01); *G06F 9/45533* (2013.01); *G06F 9/45558* (2013.01); *G06F 9/5077* (2013.01); *G06F 2009/45579* (2013.01)

(58) Field of Classification Search
None
See application file for complete search history.

(56) References Cited

U.S. PATENT DOCUMENTS

| | | | |
|---|---|---|---|
| 7,152,157 B2 * | 12/2006 | Murphy | G06F 9/5077 713/100 |
| 7,328,259 B2 | 2/2008 | Srinivasan et al. | |
| 7,389,335 B2 | 6/2008 | MacLeod et al. | |
| 7,584,275 B2 | 9/2009 | Shirota | |
| 7,725,559 B2 * | 5/2010 | Landis | G06F 9/5016 709/215 |
| 7,757,271 B2 * | 7/2010 | Amdur | G06F 21/604 726/1 |
| 7,979,749 B2 | 7/2011 | Jann et al. | |
| 7,983,150 B2 | 7/2011 | Bruckman et al. | |
| 8,098,658 B1 | 1/2012 | Ranganathan et al. | |

(Continued)

OTHER PUBLICATIONS

Javadi et al., "Cloud Resource Provisioning to Extend the Capacity of Local Resources in the Presence of Failures," 2012 IEEE:311-319.

(Continued)

*Primary Examiner* — Van H Nguyen
(74) *Attorney, Agent, or Firm* — Davis Wright Tremaine LLP (57) ABSTRACT

A method and apparatus for provisioning a computing resource is provided. Provisioning a computing resource based on a provisioning policy is initiated. The provisioning policy may specify one or more supplementary operations whose successful completion is optional for the computing resource to be used. Further in the method and apparatus, the computing resource is provided for use.

20 Claims, 8 Drawing Sheets

(56) References Cited

U.S. PATENT DOCUMENTS

| | | | |
|---|---|---|---|
| 8,141,075 B1 | 3/2012 | Chawla et al. | |
| 8,266,670 B1 | 9/2012 | Merkow et al. | |
| 8,397,273 B2 * | 3/2013 | Sallaka | G06F 21/6218 |
| | | | 726/1 |
| 8,555,287 B2 | 10/2013 | Ding et al. | |
| 8,694,811 B2 | 4/2014 | Raju et al. | |
| 8,732,706 B2 | 5/2014 | Shah et al. | |
| 8,863,137 B2 * | 10/2014 | Keller | G06F 9/5038 |
| | | | 705/1.1 |
| 8,997,078 B2 * | 3/2015 | Spivak | G06F 9/5055 |
| | | | 717/168 |
| 2008/0059972 A1 | 3/2008 | Ding et al. | |

OTHER PUBLICATIONS

Kee et al., "Grid Resource Abstraction, Virtualization, and Provisioning for Time-targeted Applications," 2008 IEEE:324-331.

Nae et al., "Dynamic Resource Provisioning in Massively Multiplayer Online Games," 2011 IEEE:381-395.

\* cited by examiner

COMPUTER RESOURCE PROVISIONING FAILURE MITIGATION

CROSS REFERENCE TO RELATED APPLICATIONS

This application is a continuation of U.S. patent application Ser. No. 14/020,186, filed Sep. 6, 2013, now U.S. Pat. No. 9,471,349, entitled "COMPUTING RESOURCE PROVISIONING FAILURE MITIGATION," which is fully incorporated by reference for all purposes herein.

BACKGROUND

The use of remote program execution, such as running virtual computer systems (virtual machines) on behalf of customers, and storage services has proliferated in recent years. The resources for remote program execution and storage are often provided by computing resource providers who leverage large-scale networks of computers, servers and storage drives to enable clients, including content providers, online merchants and the like, to host and execute a variety of applications and web services. The content providers and online merchants, who traditionally used on-site servers and storage equipment to host their websites and store and stream content to their customers, often forego on-site hosting and storage and turn to using the resources of the computing resource providers. Remote program execution and storage services allows content providers and online merchants, among others, to efficiently and adaptively satisfy their computing needs, whereby the computing and storage resources used by the content providers and online merchants are added or removed from a large pool provided by a computing resource provider as need and depending on their needs.

In addition to satisfying the computing needs of content providers and online merchants, the computing and storage resources of the computing resource provider may also be used to provide or support supplementary functions, such as providing measurements or statistics of their utilization to a service of the computing resource provider. The computing resource may be registered with the service in order to provide the measurements or statistics and the service may use the statistics to enable upward or downward scaling of allocated computing and storage resources.

It is often important for failures in registering computing resources for performing supplementary functions not to impede or prevent content providers and online merchants from receiving computing resources to satisfy their computing needs.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein include provisioning a computing resource for use by a customer. The computing resource may be any computational resource, such as a computer, server or host that is configured to provide computational power to a user using a central processing unit (CPU), graphics processing unit (GPU) or digital signal processor (DSP), among others. The computer, server or host may be physical or virtual. Further, the computing resource may be a storage volume for use in storing block-based or object-based data or a networking device that is used to facilitate communication between devices.

The computing resource may be provisioned by a computing resource service provider and may utilize the resources of the computing resource service provider for providing computing power. The computing resource is considered to be provisioned if the computing resource is operational or capable of performing its intended function of providing computing capabilities to the customer. When the computing resource is a virtual host or virtual machine, the virtual host or virtual machine may be considered to be provisioned if it is capable of providing computational power to the customer. Further, when the computing resource is an object-based storage volume, the storage volume may be considered to be operational or successfully provisioned if the storage volume is operational or if the customer is capable of reading data from the storage volume and writing data to the storage volume.

In addition to providing computing capabilities to the customer, a computing resource may perform supplementary functions or be registered with supplementary services. For the computing resource to be able to perform supplementary functions, the computing resource may be required to be operational or successfully provisioned. Further, the provisioning workflow of the computing resource may include performing a supplementary operation. The supplementary operation may include registering the computing resource with a service or registering the computing resource for performing a supplementary function. A computing resource may be successfully registered with a service, whereby a computing resource is successfully registered with the service if the computing resource is capable of interacting with the service. Examples of services with which the computing resource may be registered include an account usage tracking service. The account usage tracking service may collect utilization measurements or statistics of the computing resource and may aggregate the utilization measurements or statistics with that of other resource. The computing resource is registered with the account usage tracking service if the account usage tracking service collects utilization measurements or statistics of the computing resource. Furthermore, a computing resource service provider may attempt a supplementary operation, whereby the computing resource service provider may attempt registering a computing resource with a service and the registration of the computing resource may fail or may be deemed as being unsuccessful.

A computing resource that is capable of providing computational power to the customer may be used for this purpose despite the fact that the supplementary operation of registering the computing resource has not been successfully completed. While the computing resource is being used to provide computational power to a customer, the computing resource service provider may make subsequent attempts at supplementary operation. If the supplementary operation is successful, the computing resource is used for performing the supplementary function.

The deployment of the computing resource may be degraded as a result of the failed completion of a supplementary operation. As described herein, the deployment of the computing resource is specified by a provisioning policy. The deployment of the computing resource includes a configuration of the computing resource within a computing environment and the interaction of the computing resource with the computing environment. The configuration may set forth or prescribe the utilization of the computing instance of the resources of the computing environment or the role of the computing instance. The deployment may, for example, specify the tasks to be provided to the computing instance for processing, a type or size of a storage volume to be attached to the computing instance or a subscription of the computing instance to a load balancer for the distribution of tasks. In the event that the deployment is degraded due at least in part to an unsuccessful completion of computing resource deployment, a functional or operational computing resource may be provided for use. Portions of the degraded deployment may be retried and the provisioning policy may be followed to determine whether to maintain the computing resource.

To facilitate performing the supplementary operation (e.g., registering the computing resource for performing a supplementary function), information associated with the success or failure of the supplementary operation may be retained in metadata storage. The information may indicate each attempt by the computing resource service provider at the supplementary operation and the outcome of the attempt (e.g., success or failure). To ensure that an initial failed attempt is retried, a registration function may be implemented as a background-running process. The registration function may be launched (for example, at predetermined times) and registration function may retrieve the metadata and determine whether failed attempts have occurred. If the registration function detects a failed attempt, the registration function may make another attempt at performing the supplementary operation.

A computing resource service provider may retain a provisioning policy for a customer. The provisioning policy may specify a provisioning workflow that specifies a computing instance to be provisioned, such as a computing resource. Further, the provisioning workflow may specify an implementation of an automated process and may specify a series of steps that are to be taken when a computing resource or a customer is to be provisioned. Further, the provisioning workflow may specify one or more operations to be completed for an operational computing instance. The one or more operations may be associated with performing supplementary functions for the computing instance. The provisioning workflow may specify that attempted completion of the one or more operation is required but successful completion of the one or more operations is optional for the computing instance to be used.

Figure 1:
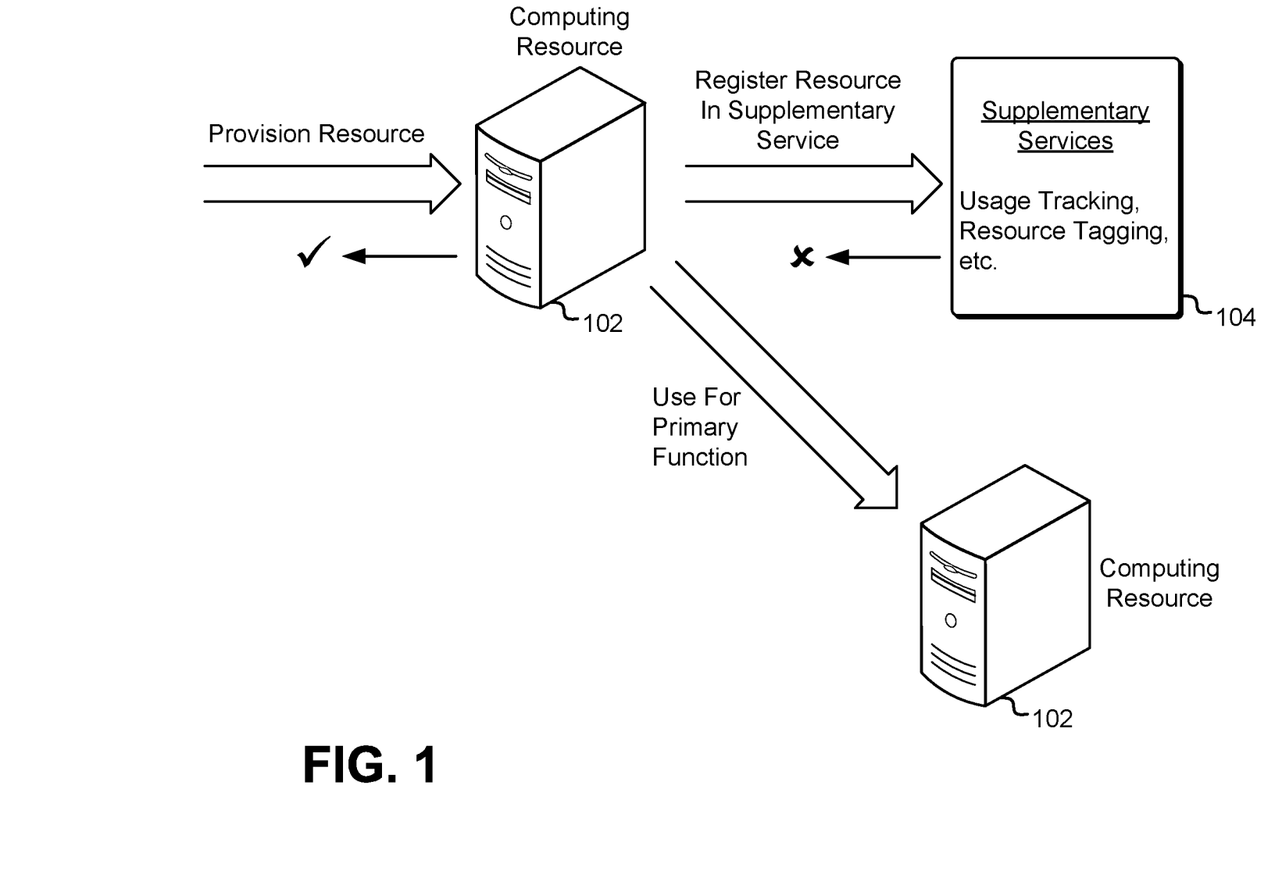
FIG. 1 shows an example of resource provisioning in a computing resource service provider.

FIG. 1 shows an example of resource provisioning in a computing resource service provider. The computing resource service provider provisions a computing resource 102 for use by a customer. The computing resource 102 may be a computer or a server that is configured to provide computational power using to the customer using a central processing unit (CPU), graphics processing unit (GPU) or digital signal processor (DSP), among others. The computing resource may be a physical computer or server or a virtual computer or server that is instantiated to emulate a physical computer or server using underlying physical resources. In addition, the computing resource may be a storage volume or a networking, communication or input/output resource. When provisioned, the computing resource 102 is capable of being used by the customer for performing computing tasks. The computing tasks may include web hosting, database management or performing computational tasks, among others.

The computing resource service provider may receive an indication of successful provisioning of the computing resource 102 and upon provisioning the computing resource 102, the computing resource service provider may also seek to perform a supplementary operation (e.g., registering the computing resource 102 in one or more supplementary services 104). The supplementary services 104 may include usage tracking or resource tagging, among others. The supplementary services 104 may enable scaling the resources allocated to the customer based on demand on the resource, identifying a resource based on tags, among others. The registration in the supplementary service 104 may not affect the ability of the computing resource 102 to service the customer or provide computing power to the customer and the computing resource 102 may be deemed to be useful to the customer and may provide services to the customer despite a failure to register the computing resource with the one or more supplementary services.

Upon attempting the supplementary operation, the computing resource service provider receives an indication that the supplementary operation has not been successful. Accordingly, the computing resource 102 may not be able to perform functions associated with the one or more supplementary services 104, whereby, for example, usage tracking or resource tagging of the computing resource 102 may not be performed. As shown in FIG. 1, although the registration of the resource in the supplementary services 104 has failed, the computing resource 102 is used for its primary function of providing computing resources to the customer.

Figure 2:
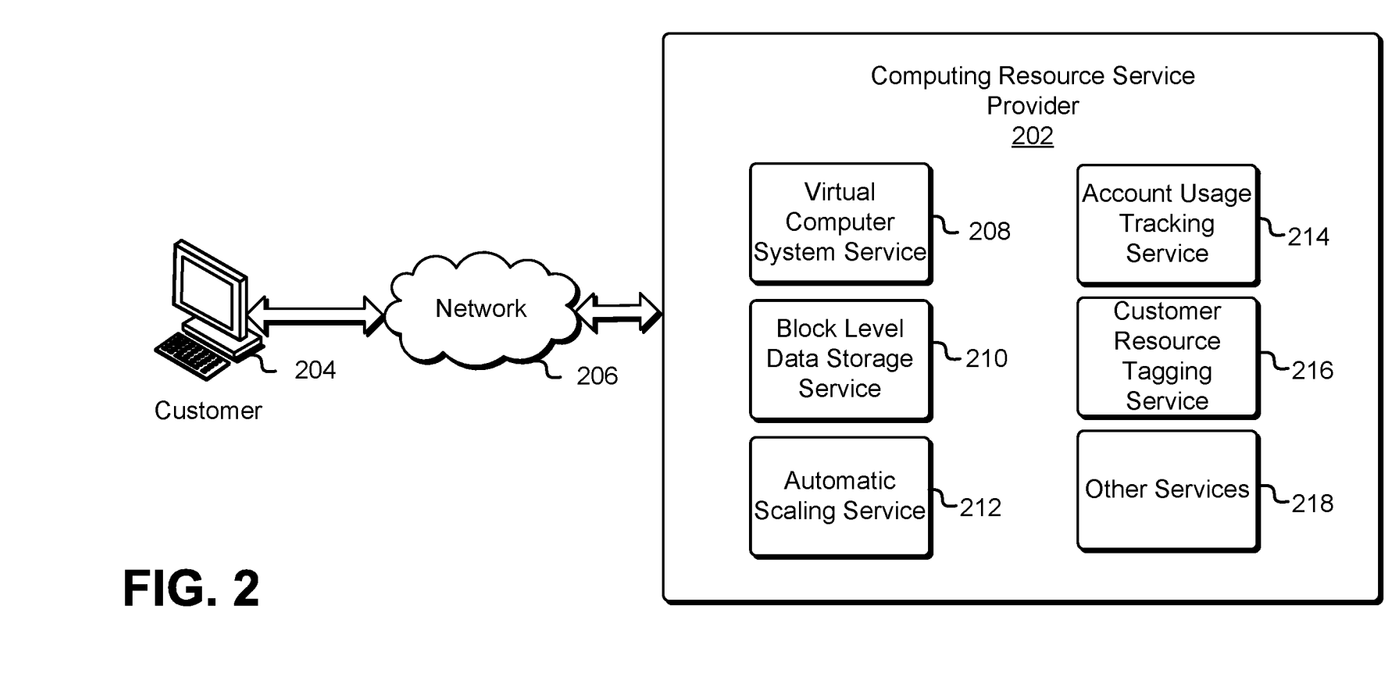
FIG. 2 shows a customer connected to a computing resource service provider offering a plurality of services.

FIG. 2 shows a customer connected to a computing resource service provider offering a plurality of services. The computing resource service provider 202 may provide a variety of services to the customer 204. The customer 204 may be an organization that may utilize one or more of the services provided by the computing resource service provider 202 to maintain and deliver information to its employees, which may be located in various geographical locations. Additionally, the customer 204 may be an individual that utilizes the services of the computing resource service provider 202 to deliver content to a working group located remotely. As shown in FIG. 2, the customer 204 may communicate with the computing resource service provider 202 through a network 206, whereby the network may be a communication network, such the Internet, an intranet or an Internet service provider (ISP) network. Some communications from the customer 204 to the computing resource service provider 202 may cause the computing resource service provider 202 to operate in accordance with one or more embodiment described herein or a variation thereof.

The computing resource service provider 202 may provide various computing resource services to its customers. The services provided by the computing resource service provider 202, in this example, include a virtual computer system service 208, a block-level data storage service 210, an automatic scaling service 212, an account usage tracking service 214, a customer resource tagging service 216 and one or more other services 218. It is noted that not all embodiments described herein include the services 208-218 of the computing resource service provider 202 and additional services may be provided in addition to or as an alternative to services explicitly described herein. Each of the services may include one or more interfaces, such as web services interface, that enable the customer 204 to submit appropriately configured API calls to the various services through web service requests. In addition, each of the services may include one or more interfaces that enable the services to access each other (e.g., to enable a virtual computer system of the virtual computer system service 208 to store data in or retrieve data from and/or access one or more block-level data storage devices provided by the block level data storage service 210 or to enable the user account usage tracking service 214 to collect measurements or statistics related to the usage of the computing resources provided by the virtual computer system service 208).

The virtual computer system service 208 may be a collection of computing resources configured to instantiate virtual machine instances onto virtual computing systems on behalf of the customers 204 of the computing resource service provider 202. Customers 204 of the computing resource service provider 202 may interact with the virtual computer systems' service 208 (via appropriately configured and authenticated API calls) to provision and operate virtual computer systems that are instantiated on physical computing devices hosted and operated by the computing resource service provider 202. The virtual computer systems may be used for various purposes, such as to operate as servers supporting a website, to operate business applications or, generally, to serve as computing power for the customer. Other applications for the virtual computer systems may be to support database applications, electronic commerce applications, business applications and/or other applications.

The block-level data storage service 210 may comprise one or more computing resources that collectively operate to store data for a customer 204 using block-level storage devices (and/or virtualizations thereof). The block-level storage devices of the block-level data storage service 210 may, for instance, be operationally attached to virtual computer systems provided by the virtual computer system service 208 to serve as logical units (e.g., virtual drives) for the virtual computer systems. A block-level storage device may enable the persistent storage of data used/generated by a corresponding virtual computer system where the virtual computer system service 208 may only provide ephemeral data storage.

The automatic scaling service 212 enables the customer to dynamically adjust the resources used by or allocated to the customer based on pre-defined conditions. The automatic scaling service 212 may permit the customer 204 to establish policies or schedules for the addition or removal of resources of the computing resource service provider 202 allocated to the customer 204. The policies may be conditional upon usage statistics or metrics of existing resources that are allocated to the customer 204 and the schedules may be time-based and may reflect pattern on the demand for resources. Further, the automatic scaling service 212 may permit the customer 204 to add or remove resources based on a health check performed on customer-allocated resources.

The computing resource service provider 202 may also include an account usage tracking service 214. The account usage tracking service 214 may collect metrics or statistics on the usage of resources allocated to the customer 204. For example, the account usage tracking service 214 may collect metrics on the usage of the instantiated virtual machines provisioned to the customer 204 and may make the metrics available to the customer 204. Further, the metrics collected by the account usage tracking service 214 may also be provided to the automatic scaling service 212 and may be used by the automatic scaling service 212 to dynamically scale the resources allocated to the customer 204. Upon configuration, a resource, for example, a virtual machine of the virtual computer system service 208, may be registered with the account usage tracking service 214 and may be instructed to provide statistics to the account usage tracking service 214.

The computing resource service provider 202 may further include a customer resource tagging service 216. The customer resource tagging service 216 may allow the customer 204 to associate resources used by the customer with customizable tags. The customizable tags may be human-readable and may facilitate the identification of the resources to the customer 204 and the communication between the customer 204 and the computing resource service provider 202, whereby, for example, the customer 204 may identify a resource by an associated tag in appropriately configured API calls. For example, the customer 204 may associate one or more instantiated virtual machines of the virtual computer system service 208 with a "web server" tag and may associate a virtual drive of the block-level data storage service 210 with a "web server-volume" tag. Upon configuration, a resource, for example, a virtual machine of the virtual computer system service 208, may be registered with the customer resource tagging service 216 and the customer resource tagging service 216 may associate one or more appropriately configured tags with the resource. A limit may be placed on the number of tags allocated to the entirety of the resources of the customer 204 or the number of tags allocated to any one of the resource used by customer 204.

The computing resource service provider 202 may additionally maintain one or more other services 214 based at least in part on the needs of its customers 204. For instance, the computing resource service provider 202 may maintain a database service for its customers 204. A database service may be a collection of computing resources that collectively operate to run one or more databases for one or more customers 204. Customers 204 of the computing resource service provider 202 may operate and manage a database from the database service by utilizing appropriately configured API calls. This, in turn, may allow a customer 204 to maintain and potentially scale the operations in the database. Other services include, but are not limited to, object-level archival data storage services, services that manage and/or monitor other services and/or other services.

It is noted that a resource of the computing resource service provider 202 may be provisioned in order to provide computing resources to the customer 204. As described herein, the computing resources may include processing power, such as that provided by a central processing unit (CPU) or a graphics processing unit (GPU), storage resources, such as that provided by a storage drive, communication, networking and input/output resources.

A resource may be said to have a plurality of functions and the plurality of functions may have varying priorities to the customer 204 or to the computing resource service provider 202. A resource that is appropriately provisioned to provide computing resources to the customer 204 may be considered to be useful to the customer 204 and may be said to be capable of performing its primary function as the resource is capable of meeting or satisfying the reason for or the motivation behind provisioning the resource. A provisioned resource may also be required to be registered with other services of the computing resource service provider 202 or a third party. The provisioned resource may be registered with the account usage tracking service 214 and may, as a result of the registration, provide usage statistics and metrics to the account usage tracking service 214. Further, the provisioned resource may be registered with the customer resource tagging service 216 and due to being registered the customer resource tagging service 216 may maintain customer-configured tags associated with the resource.

The registration with the account usage tracking service 214 or the customer resource tagging service 216, for example, may be considered to be supplementary functions as they are predicated upon the resource being capable of performing the resource's primary function (i.e., the successful provisioning of the resource and the availability of the resource to provide computing resources to the customer 204).

If attempting a supplementary operation, for example, provisioning the resource for a supplementary function, fails or if the attempt is not successfully completed but the resource is successfully provisioned for the primary function, the resource may be used for its primary function despite the failure or the unsuccessful completion of the supplementary operation. Further, if the deployment of the resource is degraded, the resource may be used for its primary function and the degraded deployment may be reattempted. Accordingly, a failed or unsuccessful supplementary operation may not prevent the utilization of the resource for performing the primary function as described with reference to FIG. 3.

Figure 3:
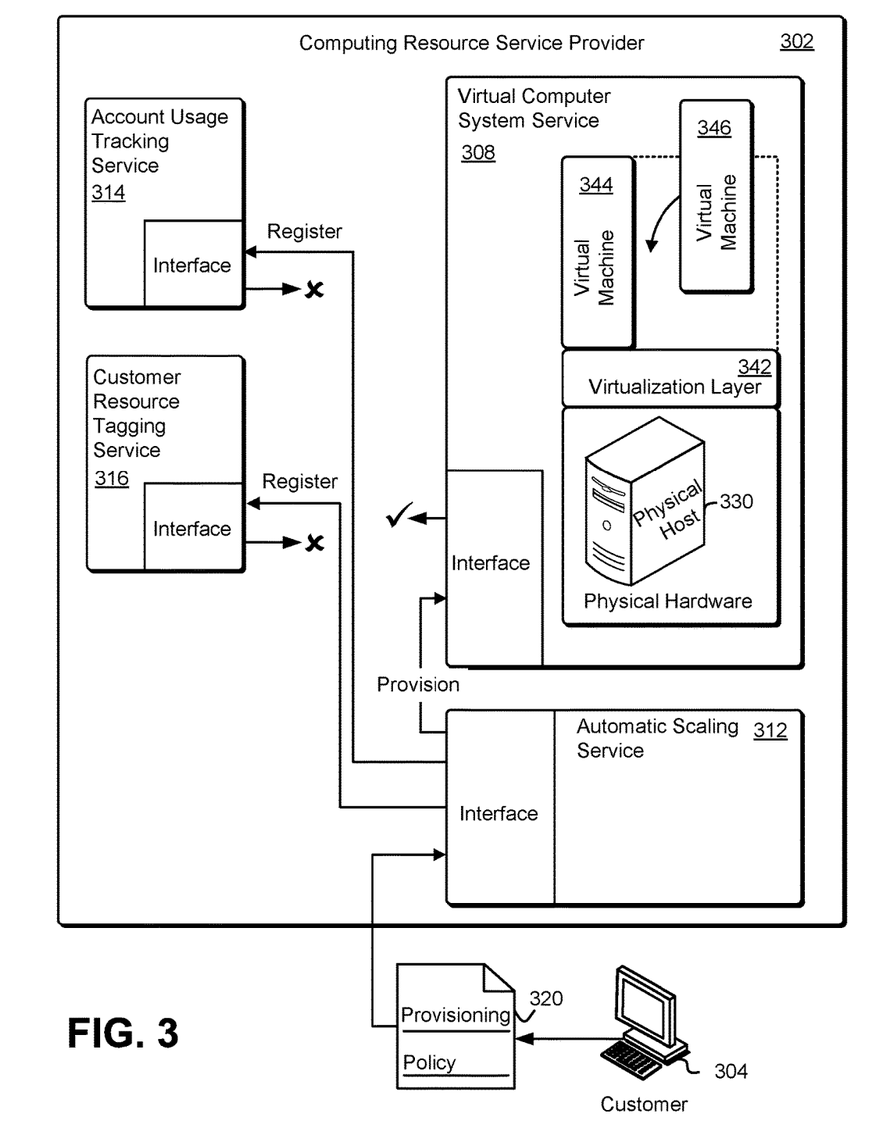
FIG. 3 shows an example of resource provisioning in a computing resource service provider.

FIG. 3 shows an example of resource provisioning in a computing resource service provider. As described herein, the computing resource service provider includes a virtual computer system service 308, an automatic scaling service 312, an account usage tracking service 314 and a customer resource tagging service 316. A customer 304 of the computing resource service provider 308 may seek to utilize the computing resources of the virtual computer system service 308. The customer 304 sends a provisioning policy 320 to the automatic scaling service 312 via an interface of the automatic scaling service 312. As described herein, the provisioning policy 320 may specify a deployment for a computing resource as well as policies, procedures, schedules or limits associated with the addition or removal of resources of the computing resource service provider 302 allocated to the customer 304.

The automatic scaling service 312 processes and stores the provisioning policy 320 received from the customer 304 and uses the provisioning policy 320 for allocating resources to the customer. The automatic scaling service 312 may increase or decrease the resources allocated to the customer 304 based on usage statistics related to the customer's resources as tracked by the account usage tracking service 314 and the provisioning policy 320 may dictate whether the allocated resources are to be increased or decreased. By way of example, the automatic scaling service 312 may determine that the virtual machines allocated to the customer 304 are heavily utilized and may add a virtual machine to those allocated to the customer 304 if permitted by the provisioning policy 320.

If the automatic scaling service 312 determines that a virtual machine is to be allocated to the customer 304 or that a deployment of the virtual machine is to be performed, the automatic scaling service 312 sends a message to the virtual computer system service 308 requesting an additional virtual machine to be provisioned for the customer 304. The message requesting the provisioning of the virtual machine may be communicated via interfaces of the automatic scaling service 312 and the virtual computer system service 308. Although the provisioning of a virtual machine is described with reference to FIG. 3, it is contemplated that any other resource may be provisioned by the automatic scaling service 312 including a storage volume or a networking resource, among others.

As described herein, the virtual computer system service 308 may include a plurality of physical hosts, such as physical host 330, whose underlying physical hardware is used by a virtualization layer 342 to instantiate virtual machines. It is noted that although only virtual machine 344 is shown in FIG. 3 as providing computing resources to the customer 304, any number of virtual machines may in fact be allocated to the customer 304. Upon receipt of the provisioning message, the virtual computer system service 308 may provision another virtual machine 346 to the customer 304. Following the successful provisioning of the virtual machine 346 the virtual computer system service 308 may send a message to the automatic scaling service 312 indicating the successful provisioning of the virtual machine 346.

Upon receipt of an indication of successful provisioning of the virtual machine 346, the automatic scaling service 312 may attempt to perform a supplementary operation of registering the virtual machine 346 with other services of the computing resource service provider 302 or a third party. As shown in FIG. 3, the automatic scaling service 312 attempts to register the virtual machine 346 with the account usage tracking service 314 and a customer resource tagging service 316. The registration of the virtual machine 346 may be in accordance with the provisioning policy 320 provided by the customer 304. The provisioning policy 320 may specify tags associated with the computing resources of the customer 304. The tags may be used by the customer 304 to identify the resources allocated to the customer 304. The automatic scaling service 312 may register tags associated with the virtual machine 344 with the customer resource tagging service 316. The customer resource tagging service 316 may maintain the tags and the identity of the virtual machines with which the tags are associated in metadata storage. Subsequently, the customer 304 may use any one of the tags to identify an associated virtual machine.

Further, although not shown in FIG. 3, the automatic scaling service 312 may attempt a supplementary operation of registering the virtual machine with a load balancer or any other service of the computing resource service provider 302 or a third party. It is noted that a load balancer may be used to distribute tasks or service requests among a plurality of virtual machines that are each configured to execute any one of the tasks or service requests. Further, the virtual machines may each be configured to receive network traffic from the load balancer. The registration of the virtual machine with any of the services may fail or the deployment of the virtual machine may be degraded and the automatic scaling service 312 may be notified of the failure of the registration or degraded deployment. Further, the automatic scaling service 312 may determine that the registration has failed or the deployment is degraded after the expiration of a time limit for the receipt of an acknowledgement associated with registration message.

Despite the failure of performing the supplementary operation of registering the virtual machine with the services of the computing resource service provider 302, the supplementary operation may be deemed to be successfully completed and the virtual machine 346 may deemed to be successfully provisioned for providing computing resources to the customer. The failure to register the virtual machine with the account usage tracking service 314 may result in the virtual machine not being able to provide usage statistics or metrics to the account usage tracking service 314 and the usage statistics of the virtual machine being excluded from contributing to the customer's usage metrics. Further, the failure to register the virtual machine 346 with the customer resource tagging service 316 may prevent the customer from addressing the virtual machine using customer-defined tags. However, the failure to register the virtual machine 346 with services of the computing resource service provider 302 or other services may not be detrimental to the virtual machine 346 performing its primary function and the virtual machine may be continued to be used for performing its primary function while the automatic scaling service retries registering the virtual machine 346.

Prior to provisioning the virtual machine, the computing resource service provider may receive from the customer launch configuration information associated with the virtual machine. The launch configuration information may specify parameters associated with the virtual machine, such as the computing power that the virtual machine is capable of providing as well as any software configurations associated with the virtual machine.

Figure 4:
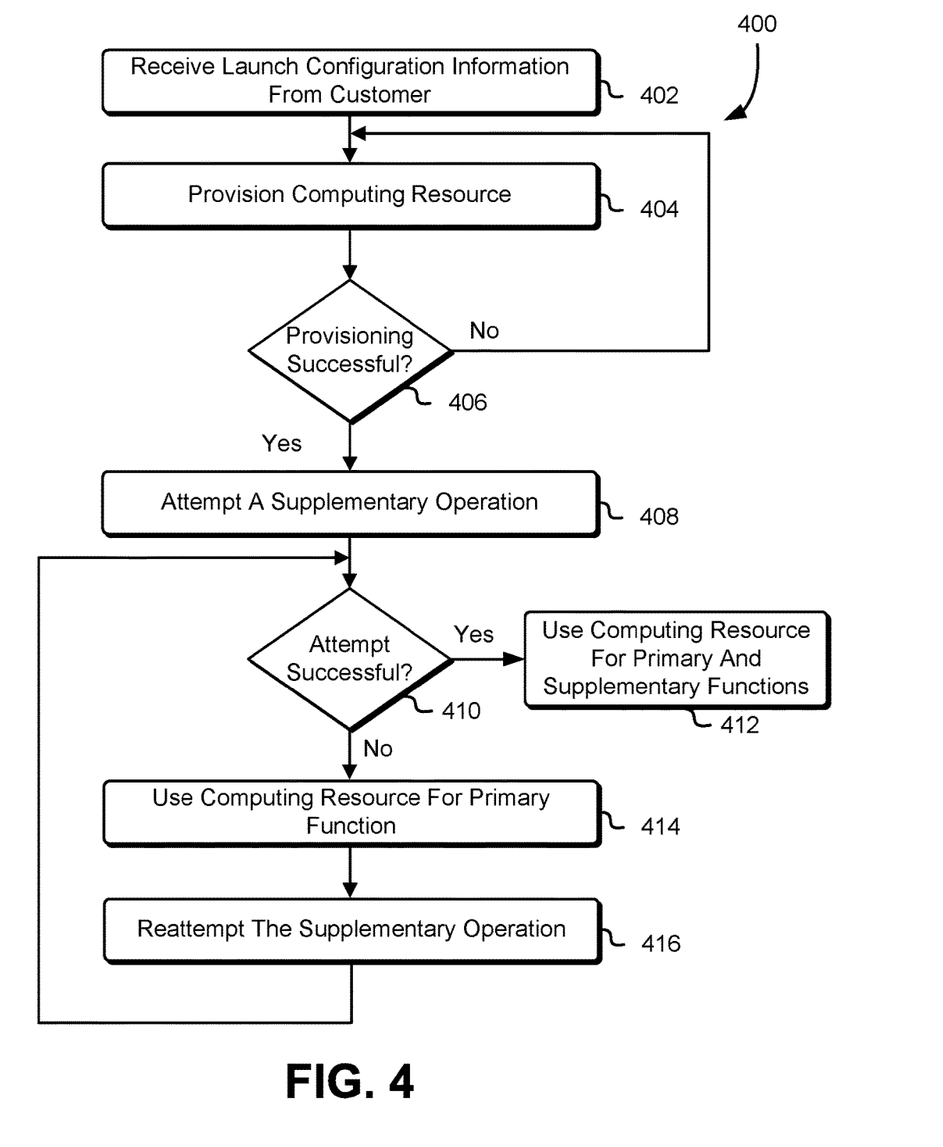
FIG. 4 shows an example of a method for receiving customer launch configuration information.

FIG. 4 shows an example of a method for receiving customer launch configuration information. In the process 400, a computing resource service provider or an entity of the computing resource service provider receives 402 launch configuration information from a customer. The entity receiving the launch configuration information may be an automatic scaling service, such as automatic scaling service 212 described with reference to FIG. 2. The launch configuration information may be a deployment policy and may specify parameters associated with a computing resource to be launched. When the computing resource is a virtual machine, the launch configuration information may include machine image information that indicates an operating system or software applications used to create the virtual machine. Further, the launch configuration information may include region or zone information that specifies the location of the computing resource within a larger or world-wide network of resources. Furthermore, as described herein, the launch configuration information may specify one or more tags associated with the computing resource or the identity of a load balancer that is responsible for sending service requests to the computing resource.

The launch configuration information may be used by the computing resource service provider to provision computing resources for the customer. Further, the launch configuration information may specify policies for scaling the resources allocated to the customer, whereby the launch configuration information may require additional computing resources to be provisioned based on a measurement of the level of usage of available resources or based on a time schedule. The computing resource service provider then provisions 404 a computing resource based on the launch configuration information. Provisioning the computing resource may be due to user demand on the available computing resources of the customer.

The computing resource service provider determines 406 whether provisioning the computing resource is successful. If a negative determination is made, the computing resource service provider attempt to provision the resource again. If, however, a positive determination is made, the resource is considered to be successfully provisioned and deemed to be operational or functional and capable of providing computing resources to the customer. Upon successful provisioning of the computing resource, the computing resource service provider attempts 408 a supplementary operation. The supplementary operation may be specified in a provisioning workflow and the successful completion of the supplementary operation may cause the computing resource to perform a supplementary function. The computing resource service provider then determines 410 whether the attempt at performing the operation is successful. If a positive determination is made, the attempt at performing the operation is considered as being successful and the computing resource is used for both the primary and the supplementary functions. If a negative determination is made, the supplementary operation is considered to be unsuccessful and the deployment is considered to be degraded and the computing resource is used 414 for both the primary function only. Further, the computing resource service provider reattempts 416 performing the supplementary operation. After the supplementary operation is reattempted 416, the process 400 proceeds to determining 410 whether the supplementary operation is successfully completed.

When the supplementary operation fails, the computing resource service provider or an automatic scaling service of the computing resource service provider may store information associated with the failed supplementary operation in metadata storage. The information may indicate the resource, e.g., virtual machine, and the services whose associated supplementary operation failed. The information may be used by the computing resource service provider or the automatic scaling service to reattempt the supplementary operation. A registration function, which may be a background-running process or a daemon, may be launched to use the information to reattempt the supplementary operation as described with reference to FIG. 5.

Figure 5:
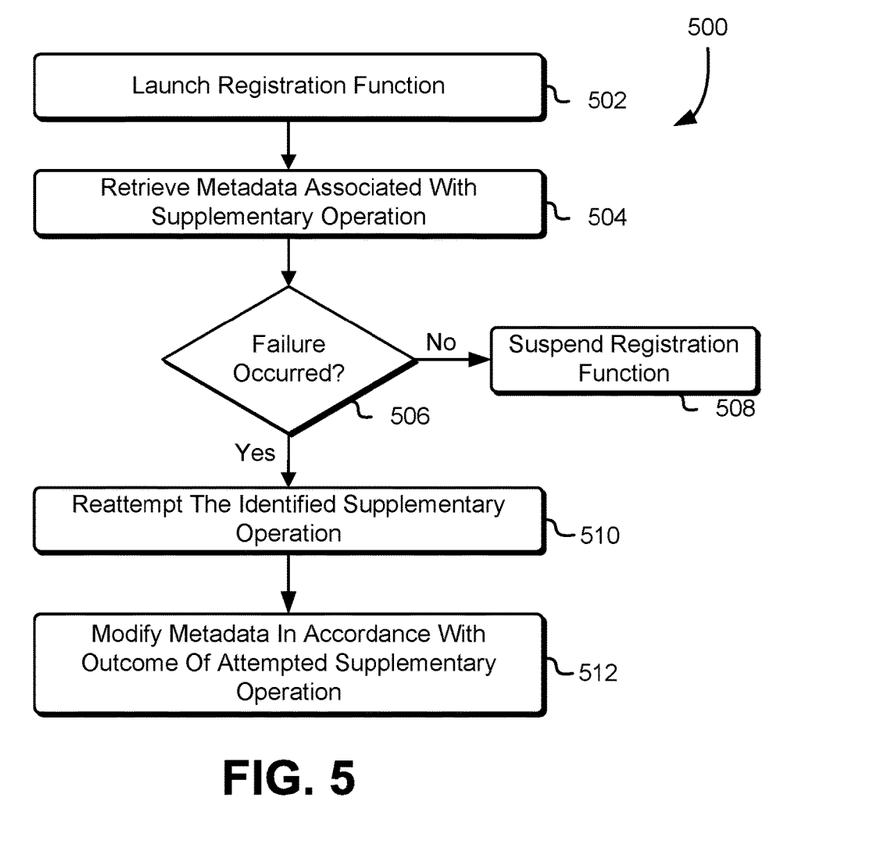
FIG. 5 shows an example of a method for performing supplementary operations.

FIG. 5 shows an example of a method for performing supplementary operations. In the process 500, the registration function is launched 502. The registration function is tasked with ensuring that supplementary operations are successfully performed in order for a computing resource to be successfully registered for performing supplementary functions. The registration function retrieves 504 metadata associated with the failed or unsuccessful supplementary operations. Based on the metadata, the registration function determines 506 whether an attempted supplementary operation failed. If it is determined that an attempted supplementary operation failed, the registration function is suspended 508 as registration function has determined the lack of supplementary operations awaiting or pending successful execution. After suspension, however, the registration function may be launched at a later time as provided by a schedule.

If it is determined that a supplementary operation has failed, the registration function reattempts 510 the identified supplementary operation. The registration function may attempt the supplementary operation by sending registration requests to the services or third party whose associated registration had failed as indicated by the metadata. The registration function may receive an indication from the services or third party as to the success or failure of the attempted registration. The registration function then modifies 512 the metadata in accordance with the outcome of the attempted supplementary operation, whereby if the supplementary operation is deemed successful, the metadata is modified reflect the successful outcome of the supplementary operation and vice-versa.

A customer's provisioning policy may set limits on the number of attempts made at performing a supplementary operation for each computing resource. Further, the customer's provisioning policy may set limits on the length of time during which an initial or subsequent supplementary operation attempt should take place. If either the time limit or the limit on the number of supplementary operation attempts expires, the registration function may cease attempting the supplementary operation. Further, the provisioning policy may dictate whether the computing resource is to be used after the time limit or the limit on the number of supplementary operation attempts expires. In some embodiments, the customer's provisioning policy may specify that the computing resource be terminated after the expiration of either limit.

A computing resource, such as a virtual machine or a storage volume, may be part of a group of resources provisioned for the customer by the computing resource service provider or an automatic scaling group of the computing resource service provider. The computing resource may be provisioned as a result of a request by the customer that specifically defines the computing resource to be provisioned. Further, the computing resource may be provisioned due to increased demand on the existing computing resources of the customer as measured by an account usage tracking service. When the resource is provisioned due to increased demand on the existing resource, the provisioning may be initiated by the automatic scaling service and without a specific request from the customer to provision the computing resource.

A group of resources that are provisioned to provide computing resource to a customer (also referred to herein as an automatic scaling group) may be subject to the provisioning policy or provisioning workflow of the customer. The provisioning policy may specify actions to be taken when the demand on the computing resources of the customer changes. For example, the provisioning policy may specify levels of resource utilization beyond which a computing resource is added to the automatic scaling group. Further, the provisioning policy may specify levels of resource utilization below which resources are removed from the automatic scaling group.

Further, the provisioning policy may specify actions to be taken based upon the success or failure of a supplementary provisioning operation attempt for any member of the automatic scaling group. The provisioning policy may specify whether an operational or successfully provisioned resource may be used for performing the resource's primary function if the supplementary operation has failed. Although, an operational resource may be useful for a customer, the customer may specify whether the resource should be used when a supplementary operations fails. Further, the provisioning policy may specify the utilization of the resource based on a status associated with other members of the automatic scaling group. The status associated with the other members of the automatic scaling group includes whether the other members of the automatic scaling group are registered for performing supplementary functions. The customer's provisioning policy may be used to determine whether an operational computing resource may be provided for use as described with reference to FIG. 6.

Figure 6:
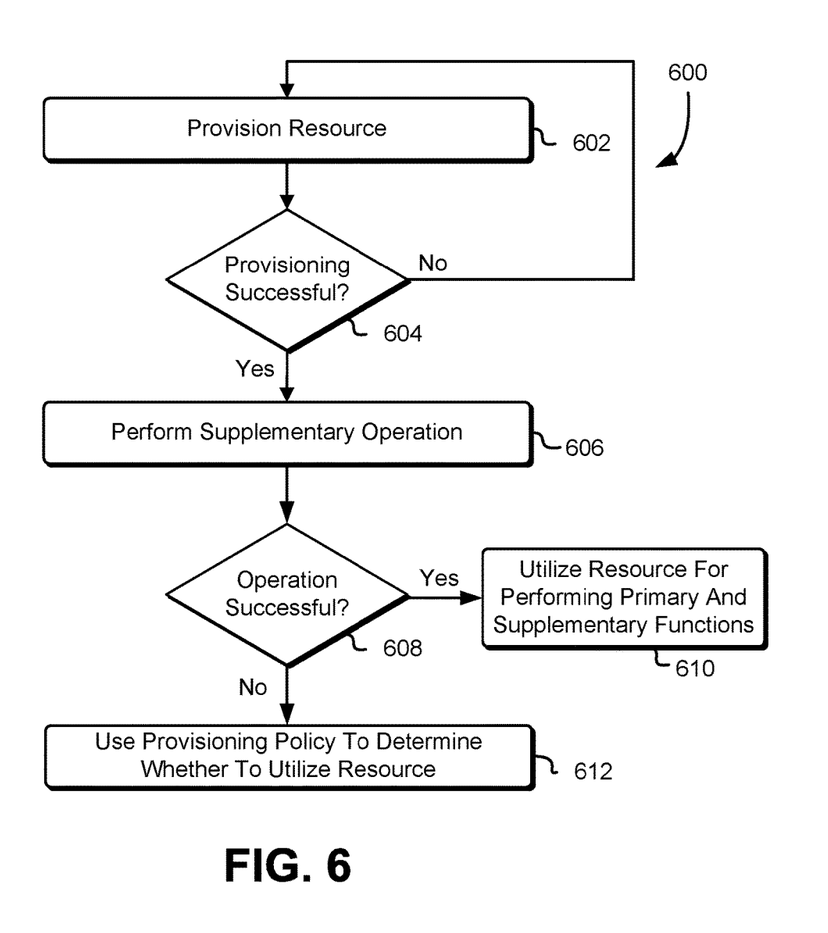
FIG. 6 shows an example of a method for resource utilization.

FIG. 6 shows an example of a method for resource utilization. In the process 600, an automatic scaling service provisions 602 a resource for use by a customer. The determination to provision the resource may be based on current utilization levels of the customer's computing resources, for example, based on utilization metrics collected by an account usage tracking service. The automatic scaling service then determines 604 whether the resource provisioning is successful. The resource may be a virtual machine and determining whether resource provisioning is successful may include determining whether the virtual machine was instantiated by a virtual computer system service, whether the virtual machine is appropriately configured to provide computing resources to the customer or whether the virtual machine is operational.

If the automatic scaling service determines that provisioning the resource was not successful, the automatic scaling service may make another attempt at provisioning the computing resource. If the automatic scaling service, on the other hand, determines that the resource was successfully provisioned, the automatic scaling service performs 606 a supplementary operation, for example, in order to register the resource for performing a supplementary function. The automatic scaling service then determines 608 whether the supplementary operation was successfully. If the automatic scaling service determines that the supplementary operation was successfully, the resource is utilized 610 for performing primary and the supplementary functions.

If, on the other hand, the automatic scaling service determines that the supplementary operation was not successful, the automatic scaling service uses 612 the customer's provisioning policy to determine whether the resource should be utilized for performing its primary function. The customer's provisioning policy may base the determination as to whether to utilize the resource on a plurality of factors associated with the automatic scaling group to which the resource belongs including: the type of resources in the customer's automatic scaling group, the number of resource in the customer's automatic scaling group, the utilization levels of the resources or the status of the supplementary operation of the resources for performing supplementary functions, among others. Further, the provisioning policy may base the determination as to whether to utilize the resource on the types of supplementary functions whose registration was successful and the types of supplementary functions whose registration was not successful. The provisioning policy may prioritize the successful completion of certain supplementary operation over other supplementary operations and may tolerate an unsuccessful supplementary operations more than other supplementary operations.

Figure 7:
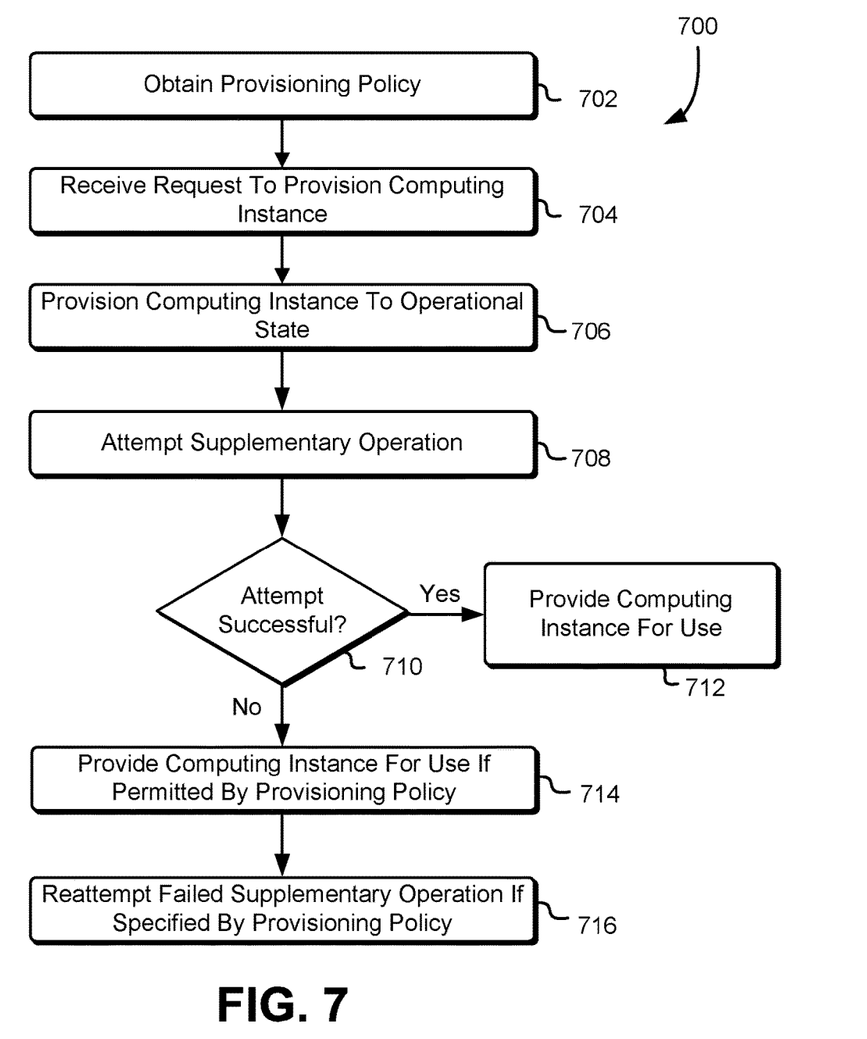
FIG. 7 shows an example of a method for computing instance provisioning.

FIG. 7 shows an example of a method for computing instance provisioning. In the process 700, a computing resource service provider obtains 702 a provisioning policy. The provisioning policy may have been previously received by the computing resource service provider from a customer and may be stored by the computing resource service provider. The provisioning policy may specify a provisioning workflow for provisioning a computing instance, such as a virtual machine. The provisioning policy may indicate one or more operations in the provisioning workflow for which attempted completion is required but for which successful completion is optional. The provisioning policy may also indicate one or more conditions for the computing instance to be usable when the computing instance has an associated operation that await successful completion.

The computing resource service provider receives 704 a request to provision the computing instance. The request may be received from the customer or may be initiated by the computing resource service provider as described herein. The computing resource service provider provisions 706 the computing instance to an operational state. The provisioning may be in accordance with a definition of the computing instance in the provisioning policy. The computing resource service provider then attempts 708 a supplementary operation for the computing instance. The supplementary operations may include registering the computing instance with a service. The supplementary operation may be in accordance with the provisioning workflow of the computing instance, whereby the provisioning workflow may specify one or more supplementary operations that are to be performed.

The computing resource service provider then determines 710 whether performing the supplementary operation is successful, whereby if the supplementary operations are successful, the computing resource service provider provides 712 the computing instance for use. It is noted that the computing instance is provided for use because the provisioning workflow of the instance is completed as the instance is operational and the supplementary operation is successfully performed. Conversely, if the registration is not successful, the computing resource service provider provides 714 the computing instance for use if that is permitted by the provisioning policy. When more than one supplementary operations are specified by the provisioning workflow, the provisioning policy may specify certain operations that are required to be performed or certain combinations of operations that are required to be successfully completed in order for the instance to be provided for use. The provisioning policy may specify that an operational instance be provided for use when certain supplementary operations are not completed or when the provisioning workflow is not complete. Further, the provisioning policy may specify that a computing instance be used even if one or more operations are not performed. Further, the computing resource service provider reattempts 716 a failed supplementary operation for the instance if specified by the provisioning policy. If more than one supplementary operations are specified by the provisioning workflow, only failed supplementary operations are reattempted while successfully completed supplementary operations are not attempted. Limits may be imposed on the number of attempts of supplementary operations, whereby, for example, a maximum number of supplementary operation attempts may be specified by the provisioning policy and attempting a supplementary is ceased if the maximum number is reached.

Figure 8:
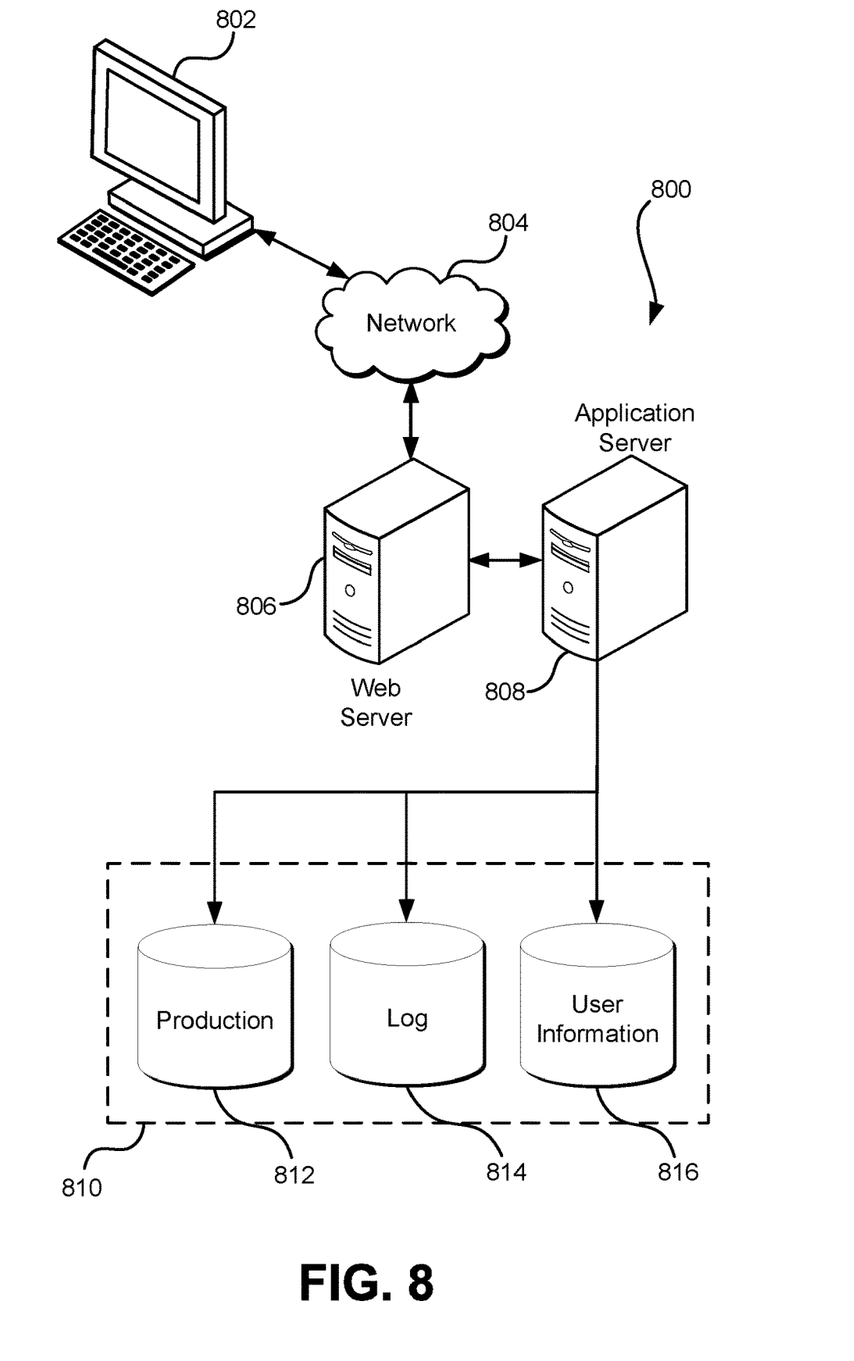
FIG. 8 illustrates an environment in which various embodiments can be implemented.

FIG. 8 illustrates aspects of an example environment 800 for implementing aspects in accordance with various embodiments. As will be appreciated, although a web-based environment is used for purposes of explanation, different environments may be used, as appropriate, to implement various embodiments. The environment includes an electronic client device 802, which can include any appropriate device operable to send and receive requests, messages or information over an appropriate network 804 and convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 806 for receiving requests and serving content in response thereto, although for other networks an alternative device serving a similar purpose could be used as would be apparent to one of ordinary skill in the art.

The illustrative environment includes at least one application server 808 and a data store 810. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling some (even a majority) of the data access and business logic for an application. The application server may provide access control services in cooperation with the data store and is able to generate content such as text, graphics, audio and/or video to be transferred to the user, which may be served to the user by the web server in the form of HyperText Markup Language ("HTML"), Extensible Markup Language ("XML") or another appropriate structured language in this example. The handling of all requests and responses, as well as the delivery of content between the client device 802 and the application server 808, can be handled by the web server. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed system.

The data store 810 can include several separate data tables, databases or other data storage mechanisms and media for storing data relating to a particular aspect of the present disclosure. For example, the data store illustrated may include mechanisms for storing production data 812 and user information 816, which can be used to serve content for the production side. The data store also is shown to include a mechanism for storing log data 814, which can be used for reporting, analysis or other such purposes. It should be understood that there can be many other aspects that may need to be stored in the data store, such as for page image information and to access right information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 802. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members used in the above conjunctive phrase, "at least one of A, B, and C" and "at least one of A, B and C" refers to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C to each be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method, comprising:
receiving a request to provision a computing resource for a primary function and a secondary function, the request being associated with a provisioning policy that includes information regarding a plurality of provisioning operations;
provisioning, based at least in part on the information of the provisioning policy, the computing resource to be operational for the primary function and the secondary function;
detecting a subset of the plurality of provisioning operations that failed to complete;
determining that the computing resource is operational for at least the primary function;
providing the computing resource for use for the primary function, the primary function comprising operations that involve the computing resource to be instantiated as a virtual machine instance; and
reattempting the subset of the plurality of provisioning operations.

2. The computer-implemented method of claim 1, wherein the provisioning is performed by an automatic scaling service.

3. The computer-implemented method of claim 1, wherein:
the computing resource is a virtual computer system instance of a virtual computer system service; and
the subset of the plurality of provisioning operations includes registering the virtual computer system instance with another service.

4. The computer-implemented method of claim 1, wherein the subset of the plurality of operations includes registering the computing resource with a load balancer.

5. The computer-implemented method of claim 1, wherein the method further comprises providing status information regarding the provisioning to a requestor associated with the request.

6. The computer-implemented method of claim 1, further comprising, based at least in part on an outcome of reattempting the subset of the plurality of operations, determining whether to deprovision the computing resource.

7. The computer-implemented method of claim 1, wherein the computing resource for use is provided on a condition that the provisioning policy specifies that successful completion of the subset of the plurality of operations is optional.

8. One or more non-transitory computer-readable storage media having collectively stored thereon instructions that, when executed by one or more processors of a system, cause the system to:
process a request to provision a computing resource, the request being associated with a provisioning policy that includes information regarding a plurality of provisioning operations, by at least:
attempting to provision, based at least in part on the information of the provisioning policy, the computing resource;
detecting a failed subset of the plurality of provisioning operations;
provisioning the computing resource for at least limited use, the limited use comprising operations that involve the computing resource to provide storage volume for a virtual machine instance; and
attempting to update the computing resource based at least in part on an outcome of reattempting the failed subset of the plurality of provisioning operations.

9. The one or more computer-readable storage media of claim 8, wherein the instructions further cause the system to reattempt the failed subset of the plurality of provisioning operations at a time after providing the computing resource for use.

10. The one or more non-transitory computer-readable storage media of claim 9, wherein the instructions further cause the system to, in response to an unsuccessful reattempt of the operation, determine, based at least in part on the provisioning policy, whether to deprovision the computing resource.

11. The one or more non-transitory computer-readable storage media of claim 8, wherein:
the computing resource is provided by a first service; and
the plurality of provisioning operations includes registration of the computing resource with another service.

12. The one or more non-transitory computer-readable storage media of claim 8, wherein the computing resource is provisioned on a condition that the provisioning policy specifies that successful completion of the failed subset of the plurality of provisioning operations is optional.

13. The one or more non-transitory computer-readable storage media of claim 8, wherein the instructions further cause the system to:
store information in metadata storage related to detecting the failed subset of the plurality of provisioning operations; and
reattempt the failed subset of the plurality of provisioning operations based at least in part on the information being stored in the metadata storage.

14. The one or more non-transitory computer-readable storage media of claim 8, wherein:
the computing resource is hosted by a computing resource service provider; and
the instructions further cause the system to receive the provisioning policy from a customer device connected to the computing resource service provider.

15. A system, comprising:
one or more processors; and
memory including instructions that, when executed by the one or more processors, cause the system to at least:
receive requests to provision computing resources associated with the system;
attempt to provision, based at least in part on information of one or more provisioning policies, the computing resources in accordance with the requests;
detect a subset of computing resources for which provisioning at least partially failed, where the at least partially failed provisioning is, based at least in part on the information, associated with a set of provisioning operations for which completion is optional;
provision the subset of computing resources for at least limited use according to the one or more provisioning policies, the limited use comprising operations that involve the subset of computing resources to provide network communication between virtual machine instances; and
update the subset of computing resources based at least in part on an outcome of reattempting the set of the plurality of provisioning operations.

16. The system of claim 15, wherein the memory includes instructions that, when executed by the one or more processors, further cause the system to update the subset of computing resources by at least determining whether to maintain the computing resource for use.

17. The system of claim 15, wherein:
the computing resources are implemented by the system; and
the provisioning policy is received from a customer entity connected to the system via a network.

18. The system of claim 15, wherein the memory includes instructions that, when executed by the one or more processors, cause the system to store metadata associated with the set of provisioning operations in metadata storage associated with the system; and
reattempt the set of plurality of provisioning operations in connection with the metadata being stored in the metadata storage.

19. The system of claim 15, wherein the set of provisioning operations includes registering the computing resource with a load balancer.

20. The system of claim 15, wherein at least some of the one or more provisioning policies specify a provisioning workflow for provisioning respective computing resources associated with the requests.

* * * * *